Feb. 21, 1967 R. M. WEISNER 3,304,835
PROJECTOR FOR DUAL IMAGES OF OPPOSITE SIDES OF OPAQUE MEANS
Filed Aug. 5, 1963 2 Sheets-Sheet 1

INVENTOR.
RALPH M. WEISNER

Feb. 21, 1967  R. M. WEISNER  3,304,835
PROJECTOR FOR DUAL IMAGES OF OPPOSITE SIDES OF OPAQUE MEANS
Filed Aug. 5, 1963  2 Sheets-Sheet 2
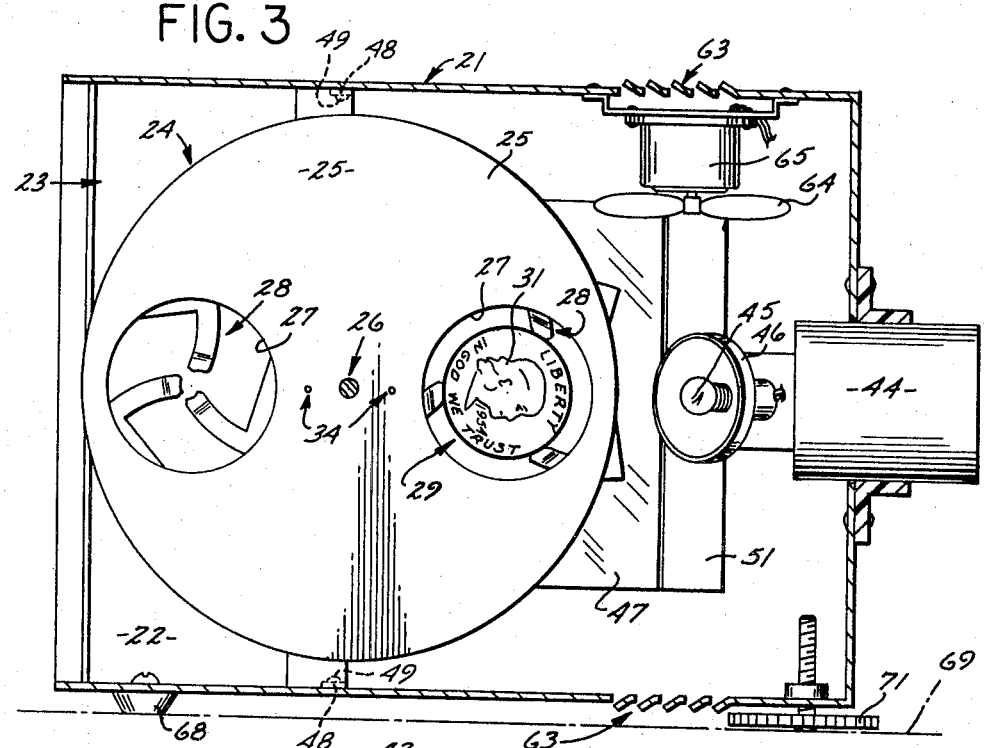
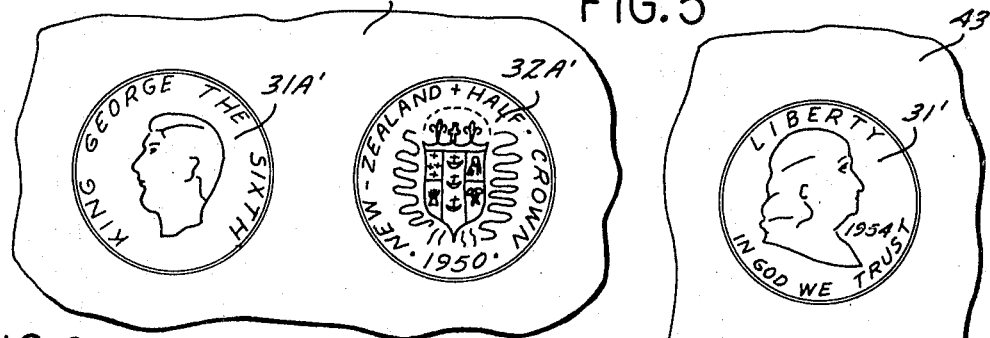
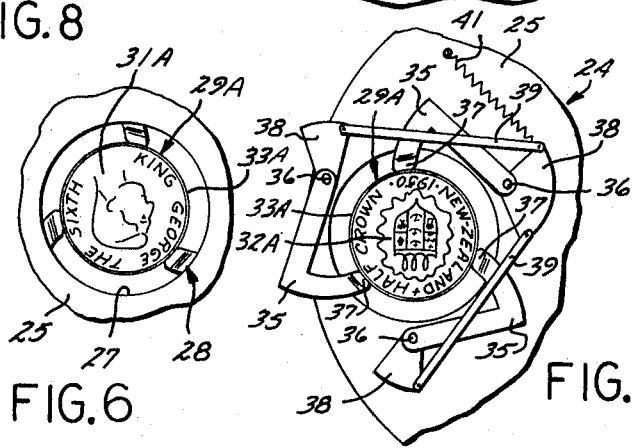
INVENTOR.
RALPH M. WEISNER

United States Patent Office 3,304,835
Patented Feb. 21, 1967

3,304,835
PROJECTOR FOR DUAL IMAGES OF OPPOSITE SIDES OF OPAQUE MEANS
Ralph M. Weisner, 23008 Mobile St., Canoga Park, Calif. 91304
Filed Aug. 5, 1963, Ser. No. 299,710
8 Claims. (Cl. 88—26)

Generally speaking, the present invention relates to the opaque projector art and, more particularly, pertains to a projector adapted to project images of opposite sides of an opaque member, such as a coin or the like, although not specifically so limited. The projected images of opposite surfaces of the coin or other opaque member are projected by the apparatus for reception by any suitable projection screen, or functional equivalent thereof, so that each of said images can be directly viewed on said projection screen and closely examined.

In those instances where the opaque member comprises a coin, it will be understood that the novel dual image opaque projector of the present invention will effectively project images of opposite surfaces of the coin onto the projection screen for direct viewing and for careful examination and comparison with the similar surfaces of an authentic coin, or pictorial representations of such a coin which are known to be authentic.

This type of examination and comparison can be facilitated by reason of the fact that the dual image opaque projector will normally enlarge the images of opposite surfaces of the coin and this can be controllably adjusted by varying the focusing of the projection lens means of the dual image projector and the relative distances between the projection screen and/or the coin with respect to the projection lens means.

It should be noted that the dual image opaque projector of the present invention is particularly suitable for projecting images of opposite surfaces of virtually any type of coin, irrespective of country of origin. In this connection it should be noted that normally official coins minted in the United States have the display surfaces on opposite sides of a coin relatively inverted, while a great many coins minted in countries foreign to the United States have the display surfaces on opposite sides of the coin similarly directed—in other words, they are not inverted with respect to each other in the manner of United States coins as mentioned above.

It should be clearly noted that the novel dual image opaque projector of the present invention is capable of projecting images of opposite display surfaces of each of the above-mentioned types of coins and of effectively erecting each pair of images on the projection screen so that they will stand upright as viewed thereon. This is a major advantage of the present invention over various other prior art opaque projectors.

With the above points in mind, it is an object of the present invention to provide a novel dual image opaque projector of the type referred to hereinbefore, having the advantages referred to hereinbefore and which is capable of projecting in erected relationship a pair of images corresponding to the display surfaces of opposite sides of any type of coin, irrespective of whether said coin initially has said display surfaces on opposite sides thereof relatively inverted or relatively erect in similar directions.

It is a further object of the present invention to provide a novel dual image opaque projector type referred to hereinbefore, which is also capable of causing the dual images to be projected onto exactly the same area of a projection or viewing screen and further provided with means for alternate illumination of opposite display surfaces of the coin (or of similar surfaces of two supposedly similar coins) so that each of said relatively superimposed images of said coin display surfaces can be viewed alternately in succession at the same location on the projection screen.

It is a further object of the present invention to provide a dual image opaque projector of the type referred to hereinbefore, which is provided with novel mounting and/or other opaque member, from a conveniently accessible rear location at the back of the dual image opaque projector apparatus to a front-located dual-image projection position with respect to the remainder of the apparatus.

It is a further object of the present invention to provide apparatus of the character set forth in the preceding object, wherein said novel mounting and/or feeding means comprises rotary turntable means provided at one or more circularly spaced locations with through-aperture means and controllably engageable and disengageable object-edge-grasping holding means of a novel type for holding the coin or other member or object by forcible peripheral edge abutment only at spaced locations therearound whereby it will be firmly supported in said dual image projection position with respect to the optical projection means of the dual image opaque projector apparatus of the present invention whenever said rotary turntable means is rotated into said relationship. Of course, it will be understood that after such dual image projection of the opposite display surfaces of the coin or other object, the next rotation of the rotary turntable means will return it toward the conveniently manually accessible rear location mentioned above for removal of said coin or other object from said rotary turntable means.

It is a further object of the present invention to provide a novel dual image opaque projector embodying any or all of the various different generic and/or specific aspects referred to herein, either individually or in combination, and which is of relatively simple, inexpensive, foolproof, easy-to-operate, and substantially maintenance-free construction such as to be conducive to widespread use thereof.

Further objects are implicit in the detailed description which follows hereinafter (which is to be considered as exemplary of, but not specifically limiting, the invention), and said objects will be apparent to persons skilled in the art after a careful study of the detailed description which follows hereinafter.

For the purpose of clarifying the nature of the present invention, one exemplary embodiment of the invention (and a very slight modification of a portion thereof) are illustrated in the hereinbelow-described figures of the accompanying two sheets of drawings and are described in detail hereinafter.

FIG. 1 is a side view, partly in section and partly in elevation, taken in the direction of the arrows 1—1 of FIG. 2. However, it should be clearly noted that the rear portion of the rotary turntable means is shown in full elevation (although the front portion is shown in section), that each of the projection light source means (or lamp and reflector means) is shown in full side elevation, that each of the light reflecting mirror means is shown in full side elevation, and that the frontally positioned projection lens means is also shown in full side elevation. This is also true of the controllably adjustable supporting means for supporting the entire housing in a proper aligned relationship with respect to the projection screen, which is shown much closer to said projection lens means than would normally be the case. This is done for drawing space conservation reasons.

FIG. 2 is a front elevational view of the entire device.

FIG. 3 is a staggered plane bottom view, taken in the direction of the arrows 3—3 of FIG. 1. This view can also be construed as comprising a side view, partly in elevation and partly in section, of the apparatus when it is turned in a clockwise direction around a longitudinal axis from the position shown in FIG. 2 substantially ninety degrees and is then placed upon what was previously its right side with what was previously considered to be its right side in FIG. 2, downwardly directed in FIG. 3. This, of course, places the rotary turntable means in a vertical plane and is the arrangement employed when foreign coins having similarly erected display surfaces on opposite sides thereof (of the type illustrated in FIGS. 6 and 7) are to have dual images of said opposite display surfaces projected in similarly erect side-by-side relationship as is shown fragmentarily in FIG. 8. In other words, this view can be construed as being a bottom view of the apparatus when employed for projecting oppositely erected display surfaces of U.S. coins as shown in FIGS. 3 and 4, or can be construed as being a side view of the apparatus when employed for projecting similarly erected opposite display surfaces of foreign coins as shown in FIGS. 6 and 7.

FIG. 4 is a fragmentary top plan view, taken in the direction of the arrows 4—4 of FIG. 1 and illustrates the normal position of a United States coin when held by the novel holding means of the present invention. In particular, this view illustrates the fact that the top (in the viewing sense) of the upwardly facing display surface (and the graphic material carried thereby) is positioned or directed toward the left thereof when it is held horizontally in the manner shown in FIGS. 1 and 4. It will, of course, be understood from a careful examination of FIG. 3 that the top (in the viewing sense) of the downwardly facing display surface (and the graphic material carried thereby) of said coin is positioned and directed toward the right thereof when it is held horizontally in the manner shown in FIGS. 1 and 3.

FIG. 5 illustrates the enlarged dual projected images of the upper and lower display surfaces of the coin carried by the novel holder means of the present invention in the dual image projection relationship shown in FIGS. 1, 3, and 4. This view clearly illustrates the fact that both projected images are similarly erected even though the actual display surfaces of opposite sides of the coin are inverted.

FIG. 6 is a fragmentary side elevational view generally similar to the corresponding portion of FIG. 3 after rotation of the entire machine onto its side for use with certain foreign type coins, such as the New Zealand half crown shown as being held by the novel coin holder means of the present invention in a relationship rotatively angularly displaced substantially ninety degrees from that of the U.S. coin in the position held in FIG. 3. This is because the foreign coin shown in FIG. 6 is of a type wherein the display surfaces, and graphic material carried thereby on opposite surfaces of the coin, are erect in *similar* directions rather than being relatively *inverted* in the manner of the U.S. coin held by said holder means in FIGS. 1, 3, and 4.

FIG. 7 is a fragmentary side elevational view looking directly at the opposite side of the coin (and the holder means) from that shown in FIG. 6 and illustrates the fact that the display surface on the opposite side of said coin is erect in a similar direction.

FIG. 8 illustrates the enlarged dual projected images of the upper and lower display surfaces of the foreign coin carried by the novel holder means of the present invention in the manner illustrated fragmentarily in FIGS. 6 and 7. This view clearly illustrates the fact that both projected images are similarly erected.

Figure 9:
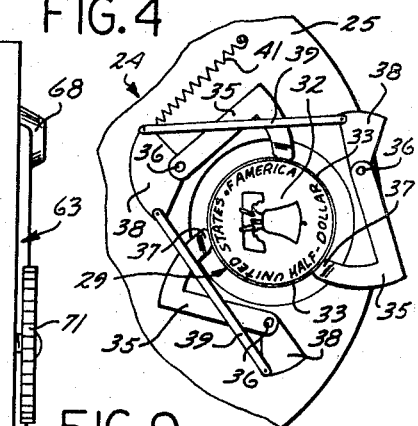

FIG. 9 is a fragmentary electrical schematic view illustrating a slight modification of the optical projection means arranged to alternately project images of opposite surfaces of a coin (or similar surfaces of two similar coins) onto a similar spot on a projection screen so that said projected images of opposite surfaces of the coin (or of similar surfaces of two supposedly similar coins) can be alternately viewed in sequence.

Generally speaking, the exemplary form of the invention illustrated comprises housing means, such as is generally indicated at 21, provided with and defining an interior chamber 22 therein and provided with a rear access opening 23 communicating with said interior chamber 22 by way of the back end of the housng 21.

The invention also includes mounting means for mounting an opaque member in a dual image projection position with respect to the apparatus. In the exemplary form of the invention illustrated, said mounting means is indicated generally at 24 and, also, effectively comprises feeding means taking the form of a rotary disc-shaped turntable means 25 provided with a substantially centrally positioned rotary mounting means, such as is indicated generally at 26, for rotatably mounting same.

In the exemplary form illustrated, said rotary turntable means 25 is provided, at two different circularly spaced locations, with through-aperture means 27 and controllably engageable and disengageable object-edge-grasping holding means, such as indicated generally at 28, for holding an opaque member or object, such as a coin or the like, although not specifically so limited in all forms of the invention, by forcible peripheral edge abutment at spaced locations around said object or coin.

Figure 1:
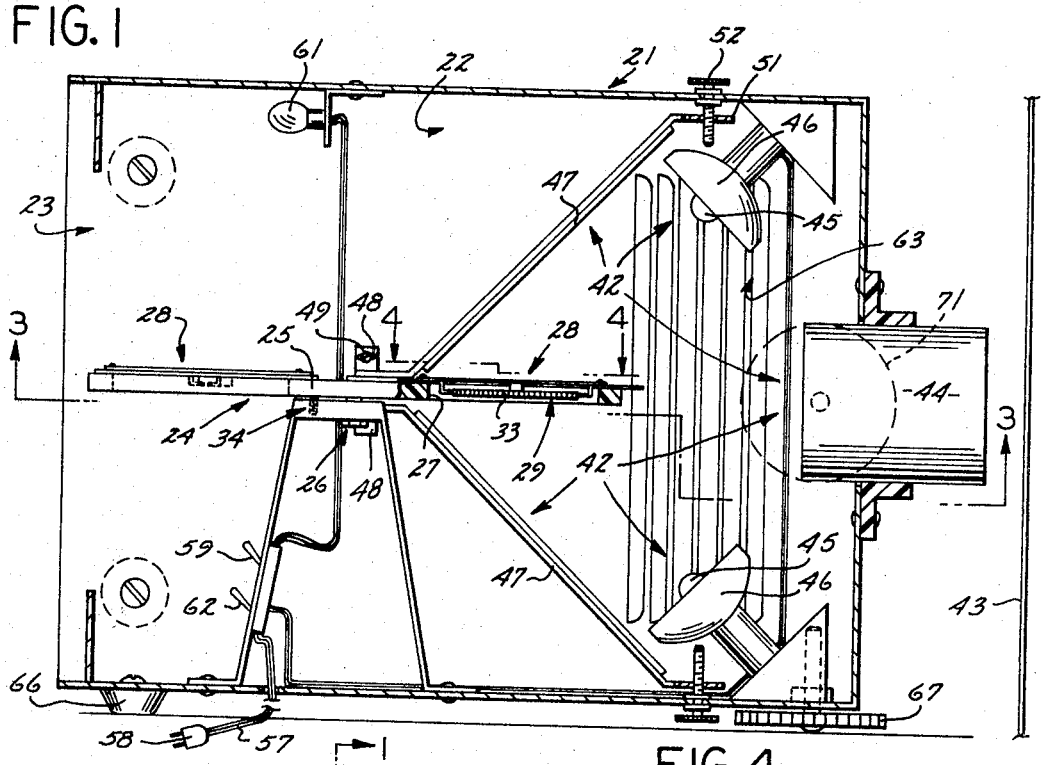

In the exemplary form of the invention illustrated and in its first application as best shown in FIGS. 1, 3, and 4, the above-mentioned opaque member or object is shown as comprising a United States coin, indicated generally at 29 and having first and second display surfaces 31 and 32.

It will be noted that the object-edge-grasping holding means 28 forcibly abuts the peripheral edge 33 of the coin 29 at three equiangularly spaced locations whereby to firmly hold the coin 29 in the hole 27 and in a manner which does not obscure or hide either of the display surfaces 31 or 32 thereof. Furthermore, as will be described in greater detail hereinafter, the novel object-edge-grasping holding means 28 is of a nature such as to be capable of such supporting edge abutment with respect to virtually any size of circular coin.

It will be noted that the rotary turntable means 25 carries two of such object-edge-grasping holding means 28 on the top surface of the turntable 25 at locations circularly spaced apart by substantially 180 degrees so that a coin can be placed in the rear or leftwardly positioned object-holding means 28, as shown in FIGS. 1 and 3, by way of the rear access opening means 23. Then the rotary turntable means 25 can be rotated with respect to the rotary mounting means 26 until said rear holding means 28 carrying such a coin 29 has been rotated into the front position which effectively comprises a dual image projection position. After completion of a dual image projecting operation, the rotary turntable means 25 can again be rotated another 180 degrees, which will return the previously projected coin to the rear position for convenient and easy manual removal, if desired.

In order to facilitate the above-described operation the rotary mounting means 26 is provided with spring-biased detent means, indicated generally at 34, for controllably releasably holding the rotary turntable means 25 in either of said 180-degree displaced positions whereby to provide for the temporary positioning of the front hole 27 and holding means 28 in said front-located dual image projection position and to subsequently provide for the forcible rotative displacement thereof rearwardly and for the moving of the other hole 27 and holding means 28 forwardly into said front-located dual image projection position.

In the exemplary form of the invention illustrated, the novel object or coin holding means, indicated generally at 28, comprises three substantially L-shaped members 35, each of which has one end pivoted as indicated at 36 to the rotary turntable 25 and each of which has a contact foot portion 37 at the other end thereof which lies in a plane substantially perpendicular to the peripheral edge 33 of the coin 29. This is best shown in FIGS. 3 and 4. Each of the members 35 has rigidly attached thereto an extension lever portion 38. Two of the extension lever portions 38 are provided with connecting rod means 39 pivotally attached thereto and connected to the extension lever portion 38 of the third L-shaped member 35. One of said extension lever portions 38 is effectively provided with biasing spring means 41 whereby to bias all of said abutment foot portions 37 inwardly for forcible contact with the peripheral edge 33 of the coin 29.

Of course, it will be understood that digital operation of any one of the extension lever portions 38 in a counter-clockwise direction as viewed in FIG. 4 with respect to the corresponding pivot pins 36 will effectively stretch the biasing tension spring 41 and cause each of the abutment foot portions 37 to move outwardly for the reception of a coin therebetween.

It should be noted that the novel coin holding means indicated generally at 28 and just described in some detail above, is a particularly advantageous arrangement for the dual image coin projector of the present invention. However, it should be noted that said dual image coin projector is not specifically limited in all instances to the use of this particular type of coin or object holder, but may employ various other functional equivalents thereof. It should also be noted that the novel object or coin holder generally designated by the reference numeral 28 may be individually employed apart from the dual image opaque projector of the present invention and may be said to comprise, per se, an inventive subcombination of the complete combination form of the invention.

The apparatus of the present invention also includes dual path optical projection means carried by the housing means 21 in a forward portion thereof and in a predetermined optical relationship with respect to said dual image projection position of the rotatable turntable means 25 and the coin 29 held by the coin holding means 28 in the front position shown in FIG. 1.

In the exemplary form of the invention illustrated, said dual path optical projection means is generally designated by the reference numeral 42 and is so arranged as to project similarly erected images of the inverted opposite display surfaces 31 and 32 of the coin 29 onto the surface of a projection screen as shown fragmentarily at 43 in FIG. 5. Said dual images are designated by the reference numerals 31' and 32', which correspond to the display surfaces 31 and 32 of the coin 29. It should, of course, be understood that the projection screen 43 is normally positioned a substantial distance to the right of the projection lens means 44 (which comprises a portion of said dual path optical projection means 42) and spaced therefrom. This spacing is not shown in FIG. 1 for drawing space conservation reasons—particularly in view of the fact that this projection phase of the invention is well known in the art.

Said dual path optical projection means 42 comprises a pair of spaced effective light source means 45, preferably of the substantially point source type, provided with corresponding reflector means 46 positioned therebehind and angularly rearwardly convergingly directed toward said dual image projection position in which the coin 29 lies in FIG. 1. The arrangement is such that the light source means 45 and reflectors 46 direct light beams angularly upon the opposite display surfaces 31 and 32 of the coin 29 which are then reflected angularly upwardly and rearwardly for impingement upon the corresponding ones of the pair of spaced light reflecting mirror means 47 (which also comprises a portion of the previously mentioned dual path optical projection means 42). Said light reflecting mirror means 47 are positioned in the rearward paths of the diverging beams of light reflected from the opposite display surfaces 31 and 32 of the coin 29. Said light-reflecting mirrors then forwardly and convergingly additionally reflect said reflected beams of light from said display surfaces 31 and 32 of the coin 29 toward a focusing region adjacent to the forward end of the housing and for passage thereof through said projection lens means 44 and for the projection of said dual images in vertically spaced, focused, similarly erected relationship onto a projection screen 43 as is clearly shown in FIG. 5.

The interior structural details of the projection lens means 44 are not shown nor described since such projection lens means are well known in the art and do not comprise any part of the real inventive concept of the present invention.

Each of the two light reflecting mirror means 47 is mounted at its inner end by a member 48 which is pivotally and controllably adjustably attached by the fastening means 49 with respect to the side wall of the housing 21. The outer end of each of said light reflecting mirror means 47 is threadedly connected by a member 51 to the threaded adjusting screw means 52 carried by the top wall of the housing 21, thus providing a controllably positionally adjustable mirror-mounting adjustable connection means (which might be termed effective superimposition means) which make it possible to angularly adjust either or both of the mirrors 47. In certain cases this may be such as to cause the dual images 31' and 32' of FIG. 5 to be directly aligned and superimposed or, in other words, to be projected onto the same part or surface area portion of the projection screen means 43. This may be desirable in certain forms of the invention where means is provided for alternate energization of the two different light source means 45 so that first one projected image 31' and then the other projected image 32' can be viewed. This may be with respect to the same coin, or a coin which is known to be authentic may be compared with a similar coin which is not known to be authentic by placing both coins in the holder means 28 with similar surfaces facing outwardly for such alternate effectively superimposed projection of the images thereof onto the screen means 43 in the manner just described.

One electrical schematic circuit arrangement for providing for such alternate energization of the light source means 45 is shown diagrammatically in FIG. 9, wherein suitable alternating interrupter means is indicated diagrammatically at 53 as being connected with respect to two different leads 54 and 55 effectively between an electric power source, indicated diagrammatically at 56, and two different light source means 45. The arrangement is such that the interrupter 53 alternately connects one or the other of the two circuits 54 or 55, and the corresponding one of the two light source means 45, with the power source 56 while the other one is disconnected therefrom, thus alternately energizing same. Since such interrupter means are well known in the art the exact structure of the interior thereof is not illustrated or described in detail. However, any well known type of interrupter means, whether of a pneumatic, thermal, electromagnetic, or other conventional type, may be employed for this purpose.

The illustrated form of the invention is provided with input lead means 57 provided with conventional electrical connector plug means 58 for connection to a mating electrical connector outlet or the like and is interiorly provided, in circuit therewith, with an on-off switch means 59 and a small light 61. The light 61 provides sufficient illumination for the insertion and removal of coins with respect to the coin holding means 28 by way of the rear access opening 23. It should be noted that a separate switch 62 is connected by the input lead means 57 with respect to the two light source means 45 so that they can be energized independently of the energization of the rear illumination light 61. However, the two switches 59 and 62 may be consolidated into one switch in certain forms of the invention, if desired.

Figure 2:
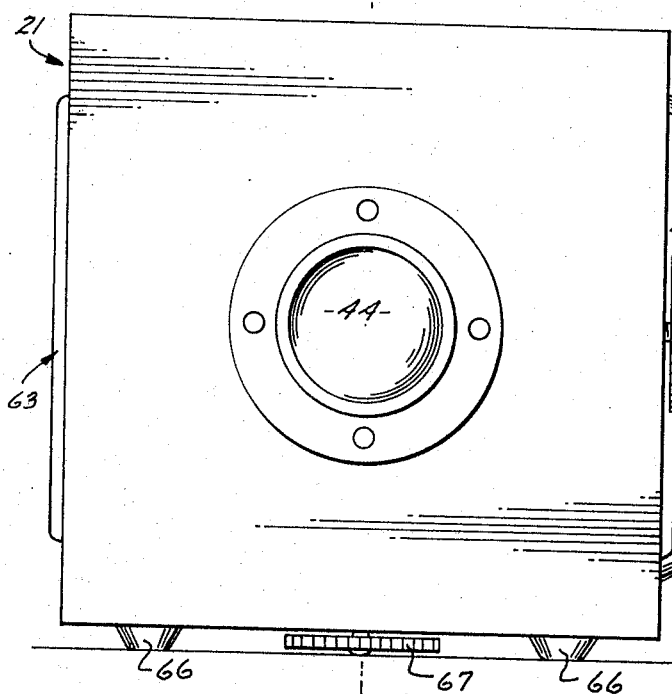

In order to cool the projection light source means 45, opposite side walls of the housing 21 are provided with ventilation louver means 63 and one of said side walls is provided with exhaust fan means 64 and driving motor means 65 adapted to be energized whenever the switch 62 is closed and the projection light source means 45 are energized. The housing 21, when in the position illustrated in FIGS. 1 and 2 with the dual path projection means 42 in a vertical planar orientation, is provided with underlying supporting feet 66 at the rear thereof and a controllably threadedly adjustable front supporting means 67 which provides for vertical adjustment of the front end of the apparatus for alignment of the projection lens means 44 with a desired portion of a projection screen such as that shown fragmentarily at 43 in FIG. 5.

However, when the apparatus is to be used for projecting similarly erected images of similarly erected opposite display surfaces of foreign coins, such as shown in FIGS. 6 and 7, the entire housing 21 is turned onto its side so that the rear side support feet 68 rest upon a horizontal supporting surface, such as is shown in phantom in FIG. 3 at 69, and so the other controllably threadedly adjustable front support member 71 (shown in FIG. 3) similarly rests upon said horizontal surface 69. Of course, this turning of the apparatus onto its side causes the dual path projection means 42 to lie in a horizontal planar orientation. This will similarly cause the projected images 31A' and 32A' of the foreign coin 29A to be projected in similarly erected relationship onto the projection screen 43 in side-by-side relationship as is clearly shown in FIG. 8. When the apparatus is used in this latter manner, the foreign coin 29A is positioned in a vertical plane in the coin holder means 28 with the coin 29A being rotated relative to the hole 27 into a position ninety degrees displaced from the positioning of the U.S. coin 29 therein as shown in FIGS. 3 and 4. This will bring about the projection of the similarly erected images 31A' and 32A' thereof on the projection screen 43 as clearly shown in FIG. 8. In other respects, this mode of using the apparatus of the present invention is substantially identical to the first mode of using the present invention which has been described in detail hereinbefore. Therefore, no further detailed description is thought necessary at this point.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:
1. A projector for dual images of opposite sides of an opaque means having substantial thickness with the opposite side surfaces of said opaque means appreciably spaced apart, comprising: housing means provided with and defining an interior chamber therein and provided with an access opening communicating with said interior chamber from the anterior of said housing means; mounting means positioned for mounting an opaque means within said housing means with the spaced side surfaces in a dual image projection position; and dual path optical projection means carried by said housing means in predetermined optical relationship with the respective spaced surfaces of said opaque means, and the portion of said mounting means mounting and carrying same, and optically cooperable therewith for illuminating opposite sides of said opaque means and projecting same along dual optical projection paths into closely adjacent similarly erected projected dual image form for viewing same in similarly erected relationship after impingement thereof upon an effective projection screen; said projection means comprising a pair of transversely space effective light source means angularly rearwardly convergingly directed toward said dual image projection position for correspondingly directing beams of light, when said light source means are energized, toward said dual image projection position for similar but oppositely directed angular impingement upon corresponding opposite sides of said opaque means and for corresponding reflection of said light beams divergingly rearwardly away therefrom, said projection means also comprising a pair of transversely spaced effective light reflecting mirror means positioned in the rearward paths of said diverging beams of light reflected from said opposite sides of said opaque means and forwardly convergingly directed toward a focusing region for the reception of said beams of light divergingly reflected from said opposite sides of said opaque means and for the converging reflection thereof forwardly toward said focusing region, said projection means being provided with dual image projection path relative adjustment and effective superimposition means providing for the adjustment of the dual projection paths of the images projected from opposite sides of said opaque means, when held in said dual image projection position, into effectively aligned and superimposed relationship for alternate viewing on a projection screen in response to alternate energization of said two light source means, said dual image projection path adjusting means comprising mechanically positionally adjustable connection means effectively connecting one of said light reflecting mirror means with respect to said housing means for positional adjustment thereof in a manner angularly altering the path of the image-defining converging beam of light reflected therefrom so as to provide for substantial effective alignment and superimposition of each of the projected images emanating from opposite sides of said opaque means at a viewing location where said projection screen is adapted to be located.

2. A projector for dual images of opposite sides of an opaque means having substantial thickness with the opposite side surfaces of said opaque means appreciably spaced apart, comprising; housing means provided with and defining an interior chamber therein and provided with an access opening communicating with said interior chamber from the anterior of said housing means; mounting means positioned for mounting an opaque means within said housing means with the spaced side surfaces in a dual image projection position; and dual path optical projection means carried by said housing means in predetermined optical relationship with the respective spaced surfaces of said opaque means, and the portion of said mounting means mounting and carrying same, and optically cooperable therewith for illuminating opposite sides of said opaque means and projecting same along dual optical projection paths into closely adjacent similarly erected projected dual image form for viewing same in similarly erected relationship after impingement thereof upon an effective projection screen, said projection means comprising a pair of transversely spaced effective light source means angularly rearwardly convergingly directed toward said dual image projection position for correspondingly directing beams of light, when said light source means are energized, toward said dual image projection position for similar but oppositely directed angular impingement upon corresponding opposite sides of said opaque means and for corresponding reflection of said light beams divergingly rearwardly away therefrom, said projection means also comprising a pair of transversely spaced effective light reflecting mirror means positioned in the rearward paths of said diverging beams of light reflected from said opposite sides of said opaque means and forwardly convergingly directed toward a focusing region for the reception of said beams of light divergingly reflected from said opposite sides of said opaque means and for the converging reflection thereof forwardly toward said focusing region; and including controllably adjustable vertical plane supporting means carried by said housing means for mounting said housing means and said projection means carried thereby in a substantially vertical planar orientation with said paired light source means and paired light reflecting mirror means being vertically angularly spaced apart and downwardly and upwardly rearwardly convergingly directed toward each other in a substantially vertical plane and toward said dual image projection position, which is horizontally oriented.

3. A projector for dual images of opposite sides of an opaque means having substantial thickness with the opposite side surfaces of said opaque means appreciably spaced apart, comprising: housing means provided with and defining an interior chamber therein and provided with an access opening communicating with said interior chamber from the anterior of said housing means; mounting means positioned for mounting an opaque means within said housing means with the spaced side surfaces in a dual image projection position; and dual path optical projection means carried by said housing means in predetermined optical relationship with the respective spaced surfaces of said opaque means, and the portion of said mounting means mounting and carrying same, and optically cooperable therewith for illuminating opposite sides of said opaque means and projecting same along dual optical projection paths into closely adjacent similarly erected projected dual image form for viewing same in similarly erected relationship after impingement thereof upon an effective projection screen, said projection means comprising a pair of transversely spaced effective light source means angularly rearwardly convergingly directed toward said dual image projection position for correspondingly directing beams of light, when said light source means are energized, toward said dual image projection position for similar but oppositely directed angular impingement upon corresponding opposite sides of said opaque means and for corresponding reflection of said light beams divergingly rearwardly away therefrom, said projection means also comprising a pair of transversely spaced effective light reflecting mirror means positioned in the rearward paths of said diverging beams of light reflected from said opposite sides of said opaque means and forwardly convergingly directed toward a focusing region for the reception of said beams of light divergingly reflected from said opposite sides of said opaque means and for the converging reflection thereof forwardly toward said focusing region; and including controllably adjustable horizontal plane supporting means carried by said housing means for mounting said housing means and said projection means carried thereby in a substantially horizontal planar orientation with said paired light source means and paired light reflecting mirror means being horizontally angularly spaced apart and horizontally inwardly rearwardly convergingly directed toward each other in a substantially horizontal plane and toward said dual image projection position, which is vertically oriented.

4. A projector for dual images of opposite sides of an opaque means having substantial thickness with the opposite side surfaces of said opaque means appreciably spaced apart, comprising: housing means provided with and defining an interior chamber therein and provided with an access opening communicating with said interior chamber from the anterior of said housing means; mounting means positioned for mounting an opaque means within said housing means with the spaced side surfaces in a dual image projection position; and dual path optical projection means carried by said housing means in predetermined optical relationship with the respective spaced surfaces of said opaque means, and the portion of said mounting means mounting and carrying same, and optically cooperable therewith for illuminating opposite sides of said opaque means and projecting same along dual optical projection paths into closely adjacent similarly erected projected dual image form for viewing same in similarly erected relationship after impingement thereof upon an effective projection screen, said projection means comprising a pair of transversely spaced effective light source means angularly rearwardly convergingly directed toward said dual image projection position for correspondingly directing beams of light, when said light source means are energized, toward said dual image projection position for similar but oppositely directed angular impingement upon corresponding opposite sides of said opaque means and for corresponding reflection of said light beams divergingly rearwardly away therefrom, said projection means also comprising a pair of transversely spaced effective light reflecting mirror means positioned in the rearward paths of said opaque means and forwardly convergingly directed toward a focusing region for the reception of said beams of light divergingly reflected from said opposite sides of said opaque means and for the converging reflection thereof forwardly toward said focusing region; and including controllably adjustable vertical plane supporting means carried by said housing means for mounting said housing means and said projection means carried thereby in a substantially vertical planar orientation with said paired light source means and paired light reflecting mirror means being vertically angularly spaced apart and downwardly and upwardly rearwardly convergingly directed toward each other in a substantially vertical plane and toward said dual image projection position, which is horizontally oriented, and controllably adjustable horizontal plane supporting means carried by said housing means for mounting said housing means and said projection means carried thereby in a substantially horizontal planar orientation with said paired light source means and paired light reflecting mirror means being horizontally angularly spaced apart and horizontally inwardly rearwardly convergingly directed toward each other in a substantially horizontal plane and toward said dual image projection position, which is vertically oriented.

5. A projector for dual images of opposite sides of an opaque means having substantial thickness with the opposite side surfaces of said opaque means appreciably spaced apart, comprising: housing means provided with and defining an interior chamber therein and provided with an access opening communicating with said interior chamber from the anterior of said housing means; mounting means positioned for mounting an opaque means within said housing means with the spaced side surfaces in a dual image projection position; and dual path optical projection means carried by said housing means in predetermined optical relationship with the respective spaced surfaces of said opaque means, and the portion of said mounting means mounting and carrying same, and optically cooperable therewith for illuminating opposite sides of said opaque means and projecting same along dual optical projection paths into closely adjacent similarly erected projected dual image form for viewing same in similarly erected relationship after impingement thereof upon an effective projection screen, said mounting means comprising a rotary, substantially horizontal, circular, disc-shaped turntable means provided with substantially centrally positioned rotary mounting means.

6. A projector for dual images of opposite sides of an opaque means having substantial thickness with the opposite side surfaces of said opaque means appreciably spaced apart, comprising: housing means provided with and defining an interior chamber therein and provided with an access opening communicating with said interior chamber from the anterior of said housing means; mounting means positioned for mounting an opaque means within said housing means with the spaced side surfaces in a dual image projection position; and dual path optical projection means carried by said housing means in predetermined optical relationship with the respective spaced surfaces of said opaque means, and the portion of said mounting means mounting and carrying same, and optically cooperable therewith for illuminating opposite sides of said opaque means and projecting same along dual optical projection paths into closely adjacent similarly erected projected dual image form for viewing same in similarly erected relationship after impingment thereof upon an effective projection screen, a projection lens, at least one of said dual path optical projection means includes reflecting means upon which the image of one side of the opaque means is impinged upon and reflected to said lens; and means for adjusting said reflecting means to compensate for the thickness of said opaque means.

7. A projector for dual images of opposite sides of an opaque means, comprising: housing means provided with and defining an interior chamber therein and provided with an access opening communicating with said interior chamber from the exterior of said housing means; mounting means positioned for mounting an opaque means within said housing means in a dual image projection position; and dual path optical projection means carried by said housing means in a predetermined optical relationship with respect to said dual image projection position of said opaque means, and the portion of said mounting means mounting and carrying same, and optically cooperable therewith for illuminating opposite sides of said opaqe means and projecting same along dual optical projection paths into closely adjacent similarly erected projected dual image form for viewing same in similarly erected relationship after impingement thereof upon an effective projection screen; said mounting means comprising a rotary, substantially horizontal, circular, disc-shaped turntable means provided with substantially centrally positioned rotary mounting means, said rotary turntable means being provided at one or more circularly spaced locations with through-aperture means and controllable engageable and disengageable object edge grasping holding means for holding said opaque means by forcible peripheral edge abutment only at spaced locations therearound in said dual image projection position with respect to said projection means when said turntable means is rotated into said position.

8. A projector for dual images of opposite sides of an opaque means, comprising: housing means provided with and defining an interior chamber therein and provided with an access opening communicating with said interior chamber from the exterior of said housing means; mounting means positioned for mounting an opaque means within said housing means in a dual image projection position; and dual path optical projection means carried by said housing means in a predetermined optical relationship with respect to said dual image projection position of said opaque means, and the portion of said mounting means mounting and carrying same, and optically cooperable therewith for illuminating opposite sides of said opaque means and projecting same along dual optical projection paths into closely adjacent similarly erected projected dual image form for viewing same in similarly erected relationship after impingement thereof upon an effective projection screen; said mounting means comprising a rotary, substantially horizontal, circular, disc-shaped turntable means provided with substantially centrally positioned rotary mounting means, said rotary turntable means being provided at one or more circularly spaced locations with through-aperture means and controllable engageable and disengageable object edge grasping holding means for holding said opaque means by forcible peripheral edge abutment only at spaced locations therearound in said dual image projection position with respect to said projection means when said turntable means is rotated into said position, said turntable means being effectively provided with detent means for holding it with said object edge grasping holding means and through-aperture means in said dual image projection position and for controllably releasing said turntable means for returning same to a conveniently manually accessible object removable and/or replacement position when desired.

References Cited by the Examiner
UNITED STATES PATENTS

| | | | |
|---|---|---|---|
| 960,519 | 6/1910 | Dutton | 88—26 |
| 2,219,458 | 10/1940 | Sohns | 88—24 |
| 2,291,006 | 7/1942 | Stuart | 88—24 |

NORTON ANSHER, *Primary Examiner.*

H. H. FLANDERS, *Assistant Examiner.*